June 10, 1969   D. DE JAGER   3,449,041
TRIPLET-TYPE OBJECTIVE LENS
Filed Jan. 23, 1967
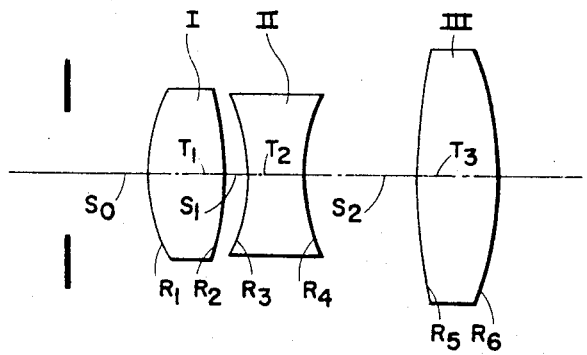
DONALD De JAGER
BY *William F. Delaney Jr*
*Robert W Hampton*
ATTORNEYS

United States Patent Office 3,449,041
Patented June 10, 1969

---

3,449,041
TRIPLET-TYPE OBJECTIVE LENS
Donald De Jager, Rochester, N.Y., assignor to Eastman Kodak Company, Rochester, N.Y., a corporation of New Jersey
Filed Jan. 23, 1967, Ser. No. 611,117
Int. Cl. G02b 9/14
U.S. Cl. 350—226                 2 Claims

---

ABSTRACT OF THE DISCLOSURE

An all plastic photographic objective of the simple triplet type is disclosed which is well corrected for all aberrations, particularly chromatic and spherical aberrations.

---

This invention relates to improvements in plastic photographic objectives of the simple triplet type, particularly adapted for use on movie cameras.

An all plastic photographic objective of the simple triplet all-plastic triplet type of photographic objective, which is well corrected for spherical and chromatic aberrations, coma, astigmatism, and curvature of field.

Further objects and advantages will be found in the details of construction disclosed in the accompanying examples and drawing.

The present invention comprises triplet objectives having two outer positive biconvex elements and an inner negative biconcave element. The objectives of this invention can be constructed entirely of plastic materials, which have the advantages over glass lenses of low cost and manufacturing simplicity. The use and advantage of plastic elements in triplets is discussed in U.S. Patent 3,194,116 which discloses triplet objectives having the negative element formed from a copolymer of acrylonitrile and styrene, which has an index of refraction $N_D$ about 1.56 and and index of dispersion V about 37. The positive elements can be formed from methylmethacrylate, which has an index of refraction $N_D$ about 1.49 and an index of dispersion about 57.

The drawing shows a cross sectional view of an objective embodying the invention with long conjugate on the left.

The objective in the drawing comprises three airspaced simple lenses, designated I, II and III. The outer two lenses I and III are positive biconvex elements, and the inner lens II is a negative biconcave element. The diaphragm is located in front of lens element I.

Numerical data for constructing two forms of photographic objectives according to the invention as outlined above is given in the following examples in which the lens elements are numbered from front to rear, N is the index of refraction of the lens elements for the D line, V is the index of dispersion, and R, T and S refer respectively to the radii of curvature of the lens spaces, the thicknesses of the lens elements and the airspaces between the elements, numbered by subscript from front to rear.

EXAMPLE 1
[Equivalent Focal Length=100 mm.   f/5.0]

| Lens | $N_D$ | V | Radii (mm.) | Thicknesses and spacings (mm.) |
|---|---|---|---|---|
| Stop |  |  |  | $S_0$=24.4 |
| I | 1.49 | 57.4 | $R_1$=44.1 | $T_1$=24.9 |
|  |  |  | $R_2$=−52.4 | $S_1$=1.41 |
| II | 1.57 | 36.6 | $R_3$=−45.9 | $T_2$=18.4 |
|  |  |  | $R_4$=31.4 | $S_2$=4.30 |
| III | 1.49 | 57.4 | $R_5$=41.5 | $T_3$=16.8 |
|  |  |  | $R_6$=−62.5 |  |

EXAMPLE 2
[Equivalent Focal Length=100 mm.   f/5.6]

| Lens | $N_D$ | V | Radii (mm.) | Thicknesses and Spacings (mm.) |
|---|---|---|---|---|
| Stop |  |  |  | $S_0$=11.5 |
| I | 1.49 | 57.4 | $R_1$=23.0 | $T_1$=11.7 |
|  |  |  | $R_2$=−37.4 | $S_1$=3.2 |
| II | 1.57 | 36.6 | $R_3$=−24.5 | $T_2$=7.7 |
|  |  |  | $R_4$=−24.4 | $S_2$=16.8 |
| III | 1.49 | 57.4 | $R_5$=84.2 | $T_3$=12.3 |
|  |  |  | $R_6$=−30.8 |  |

In both of the above examples, the positive elements are formed from methylmethacrylate, and the negative elements are formed from a copolymer of acrylonitrile and styrene.

Although the invention has been described in considerable detail with reference to certain preferred embodiments thereof, it will be understood that variations and modifications can be effected without departing from the spirit and scope of the invention as described hereinabove.

I claim:
1. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.441F$ | $T_1=.249F$ |
|   |      |      | $R_2=-.524F$ | $S_1=.014F$ |
| II | 1.57 | 36.6 | $R_3=-.459F$ | $T_2=.184F$ |
|   |      |      | $R_4=.314F$ | $S_2=.043F$ |
| III | 1.49 | 57.4 | $R_5=.415F$ | $T_3=.168F$ |
|   |      |      | $R_6=-.625F$ |   |

2. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.230F$ | $T_1=.117F$ |
|   |      |      | $R_2=-.374F$ | $S_1=.032F$ |
| II | 1.57 | 36.6 | $R_3=.245F$ | $T_2=.077F$ |
|   |      |      | $R_4=.244F$ | $S_2=.168F$ |
| III | 1.49 | 57.4 | $R_5=.842F$ | $T_3=.123F$ |
|   |      |      | $R_6=-.508F$ |   |

References Cited
UNITED STATES PATENTS 2,430,550 11/1947 Altman et al.
3,194,116 7/1965 Altman.

DAVID SCHONBERG, *Primary Examiner.*
R. J. STERN, *Assistant Examiner.*

U.S. Cl. X.R.
350—206